US009584632B2

(12) United States Patent
Chakhaiyar

(10) Patent No.: US 9,584,632 B2
(45) Date of Patent: Feb. 28, 2017

(54) SYSTEMS AND METHODS FOR MULTI-PROTOCOL TRANSLATION

(71) Applicant: Madhukar Gunjan Chakhaiyar, Gaya (IN)

(72) Inventor: Madhukar Gunjan Chakhaiyar, Gaya (IN)

(73) Assignee: WIPRO LIMITED, Bangalore (IN)

( * ) Notice: Subject to any disclaimer, the term of this patent is extended or adjusted under 35 U.S.C. 154(b) by 228 days.

(21) Appl. No.: 14/065,392

(22) Filed: Oct. 28, 2013

(65) Prior Publication Data

US 2015/0067188 A1    Mar. 5, 2015

(30) Foreign Application Priority Data

Aug. 28, 2013   (IN) .......................... 3825/CHE/2013

(51) Int. Cl.
  *G06F 15/16*   (2006.01)
  *H04L 29/06*   (2006.01)
(52) U.S. Cl.
  CPC .............. *H04L 69/18* (2013.01); *H04L 69/08* (2013.01)
(58) Field of Classification Search
  CPC ...................................................... H04L 69/18
  See application file for complete search history.

(56) References Cited

U.S. PATENT DOCUMENTS

| 6,708,232 | B2 | 3/2004 | Obara |
| 7,185,062 | B2 | 2/2007 | Lolayekar et al. |
| 2002/0002638 | A1* | 1/2002 | Obara ................... G06F 3/0601 710/11 |
| 2003/0093541 | A1* | 5/2003 | Lolayekar et al. ........... 709/230 |
| 2004/0148376 | A1 | 7/2004 | Rangan et al. |
| 2007/0025259 | A1* | 2/2007 | Reinhold ...................... 370/241 |
| 2009/0052461 | A1* | 2/2009 | Brown et al. ................. 370/401 |
| 2010/0017497 | A1 | 1/2010 | Brown et al. |

* cited by examiner

*Primary Examiner* — Vivek Srivastava
*Assistant Examiner* — Nicholas Celani
(74) *Attorney, Agent, or Firm* — Finnegan, Henderson, Farabow, Garrett & Dunner LLP

(57) ABSTRACT

This disclosure relates generally to communication network protocols, and more particularly to systems and methods for multi-protocol translation. In one embodiment, a multi-protocol translation method is disclosed, comprising: receiving, at a storage area network switch, a frame formatted according to a first protocol; selecting, using the received frame, a second protocol from a plurality of protocols according to which to convert the received frame; obtaining a protocol format specification data of a second protocol; converting by the storage area network switch, the received frame to a converted frame according to the second protocol based on the protocol format specification data of the second protocol; and providing, by the storage area network switch, the converted frame.

24 Claims, 5 Drawing Sheets

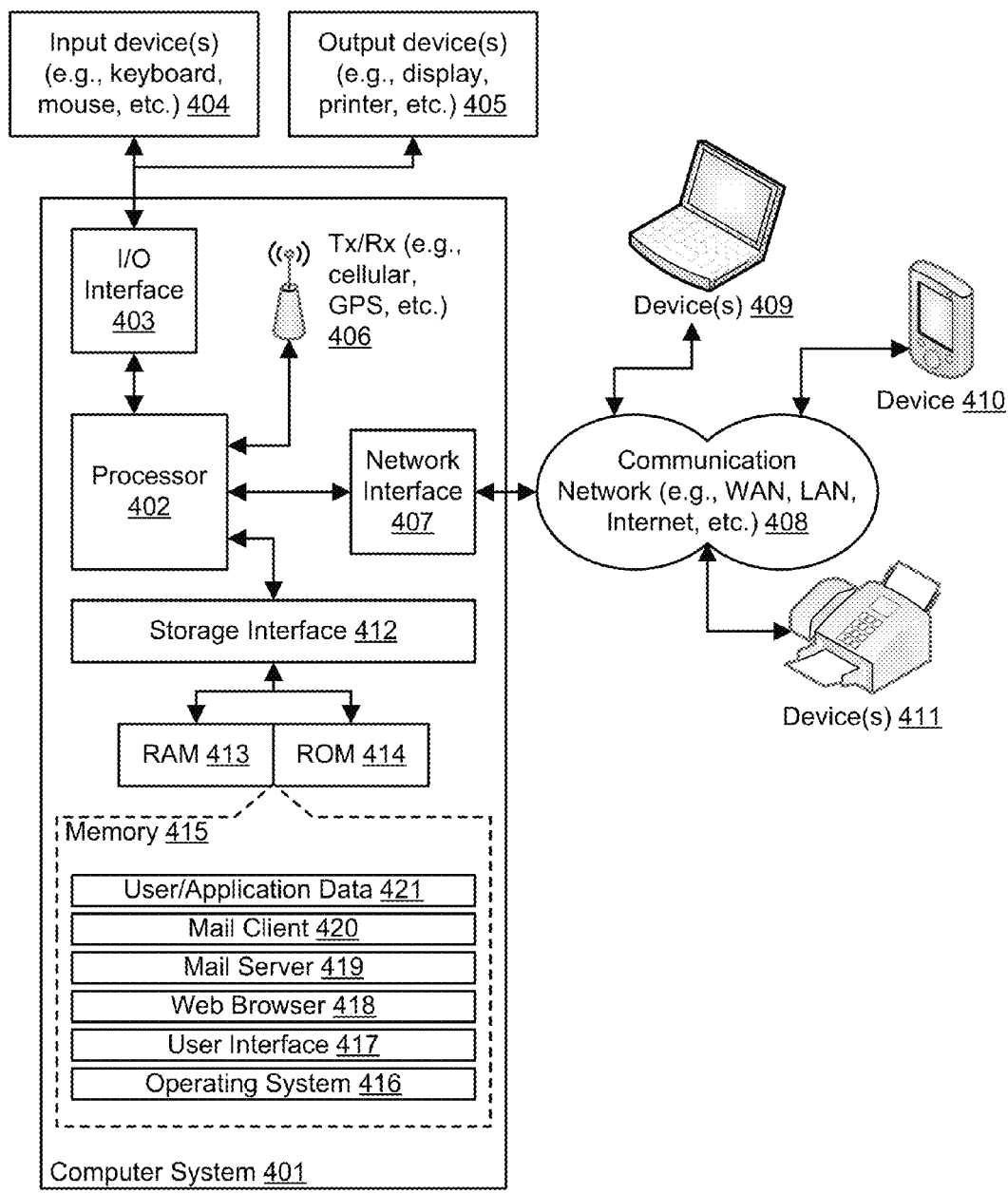
FIG. 4: Example Computer System

SYSTEMS AND METHODS FOR MULTI-PROTOCOL TRANSLATION

PRIORITY CLAIM

This U.S. patent application claims priority under 35 U.S.C. §119 to: India Application No. 3825/CHE/2013, filed Aug. 28, 2013, and entitled "Systems and Methods for Multi-Protocol Translation." The aforementioned application is incorporated herein by reference in its entirety.

TECHNICAL FIELD

This disclosure relates generally to communication network protocols, and more particularly to systems and methods for multi-protocol translation.

BACKGROUND

With increasing needs for storage of data, storage area networks (SANs) have become a widely accepted solution for storing huge amount of data associated with a network of host devices. In a SAN, a switching device connects host devices such as data servers to storage databases in a storage area network. To overcome interoperability issues, the switching device may have protocol translation features which enable a host device of one protocol to interact with a storage database of a different protocol in the SAN.

Protocol translation is currently implemented by installing one or more line cards in the switching device. These line cards are protocol specific, i.e., to connect a host device associated with a particular protocol to the switching device, a line card associated with the same protocol as the host device must be installed in the switching device. For example, GigE line cards are used in a switching device for connections with Ethernet devices, fiber channel (FC) line cards are used for connections with FC devices, and so on. Further, each line card associated with a particular protocol has a separate specific-purpose processor associated with it for translating frames associated with that protocol to a second protocol. For example, FC frames must be provided to an FC line card, which further provides the FC frames to a FC-specific processor 1 associated with the FC line card for translation. Similarly, Infiniband (IB) frames must be provided to an IB line card, which further provides the IB frames to a IB-specific processor 2 associated with the IB line card for translation.

SUMMARY

In one embodiment, a multi-protocol translation method is disclosed, comprising: receiving, at a storage area network switch, a frame formatted according to a first protocol; selecting, using the received frame, a second protocol from a plurality of protocols according to which to convert the received frame; obtaining a protocol format specification data of a second protocol; converting by the storage area network switch, the received frame to a converted frame according to the second protocol based on the protocol format specification data of the second protocol; and providing, by the storage area network switch, the converted frame.

In one embodiment, a frame translation apparatus is disclosed, comprising: a processor; and a memory storing instructions executable by the processor, wherein the instructions comprise instructions to: receive a frame formatted according to a first protocol; select, using the received frame, a second protocol from a plurality of protocols according to which to convert the received frame; obtaining a protocol format specification data of a second protocol; convert the received frame to a converted frame according to the second protocol based on the protocol format specification data of the second protocol; and provide the converted frame.

In one embodiment, a non-transitory computer readable medium is disclosed, having stored thereon computer-executable multi-protocol switching instructions, the instructions comprising instructions for: receiving a frame formatted according to a first protocol; selecting, using the received frame, a second protocol from a plurality of protocols according to which to convert the received frame; obtaining a protocol format specification data of a second protocol; converting the received frame to a converted frame according to the second protocol based on the protocol format specification data of the second protocol; and providing the converted frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
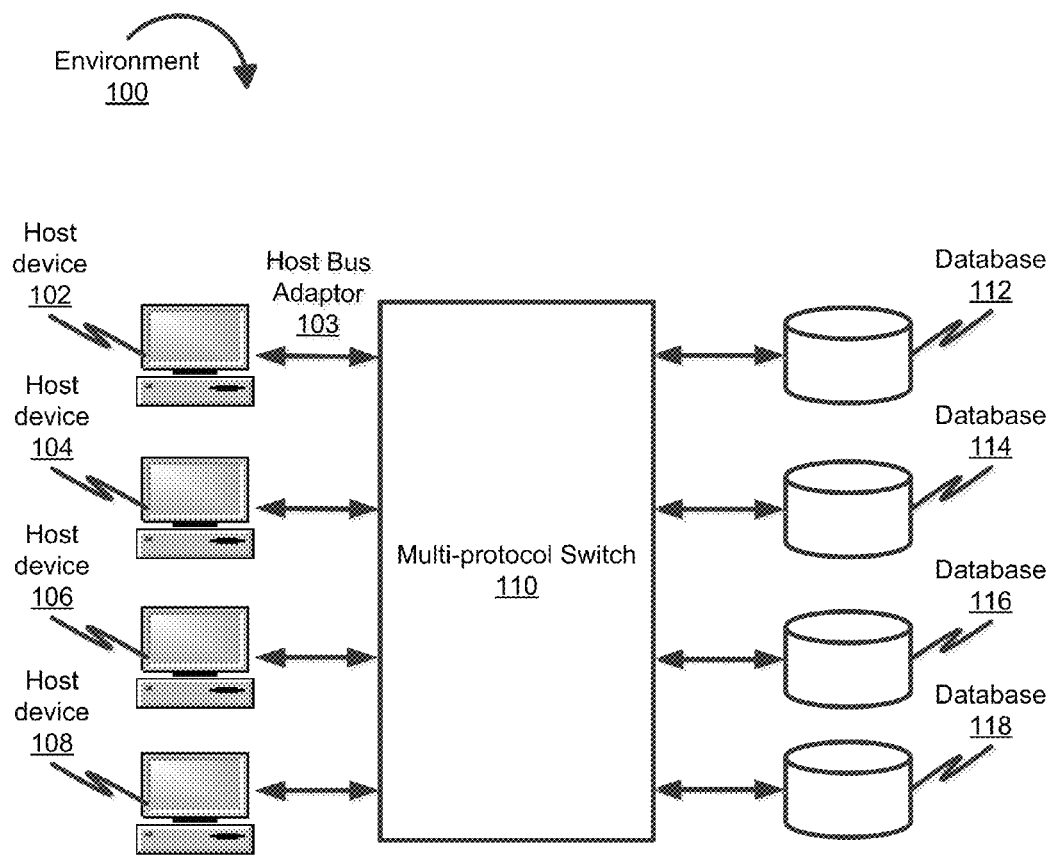
FIG. 1 illustrates an exemplary environment in which various embodiments may function.

FIG. 1 illustrates an exemplary environment 100 in which various embodiments may function. In some embodiments, environment 100 may represent a storage area network (SAN) that includes a host device 102, a host device 104, a host device 106, a host device 108, a switching device 110, a database 112, a database 114, a database 116, and a database 118. It should be apparent to a person skilled in the art that the number of host devices or databases is not limited to the configuration shown in FIG. 1 and any number of host devices or databases that may be required to implement the details of this disclosure may be used. In addition, the number of host devices may not necessarily be equivalent to the number of databases.

Further, one or more of the host devices shown in FIG. 1 may interact with one or more of a database 112, a database 114, a database 116, and a database 118 via switching device 110. In some embodiments, a host device may include, without limitation, a data server that includes processing and storage capabilities. Such a host device may include, without limitation, a desktop computer, a laptop, a tablet, a mobile device, and a personal digital assistant. Further, a database may include one or more storage devices such as, but not limited to: disk arrays, Redundant Array of Independent Disks (RAID) systems, Just a Bunch Of Disks (JBOD's), optical storage devices, and tape devices.

In some embodiments, host bus adaptors (HBAs), e.g., 103, may be used to connect host devices and databases to switching device 110. The host devices of FIG. 1 may interact with the databases of FIG. 1 to store data associated with the host devices in the databases. A host device (host device 102, host device 104 etc) may provide data to switching device 110 in the form of frames that are formatted according to a protocol associated with the host device. Switching device 110 may further provide data to a database (database 114, database 116 etc.) in the form of frames that are formatted according to a protocol associated with the database. A host device associated with one protocol may interact with a database associated with the same or a different protocol as the host device via switching device 110. Examples of such protocols associated with the host device and/or database include without limitation: Ethernet; InfiniBand; Serial Attached Small Computer System Interface; Internet Small Computer System Interface; and Fibre Channel protocols.

In an examplary scenario, host device 102 and host device 108 may be associated with a fibre channel (FC) protocol. Similarly, host device 104 may be associated with InfiniBand (IB) protocol, host device 106 may be associated with Internet Small Computer System Interface (iSCSI) protocol. Further, database 112 and database 114 may be associated with an Ethernet protocol, database 116 may be associated with iSCSI protocol, and database 118 may be associated with IB protocol.

In keeping with this example, each of the host devices may interact with one or more of the databases as illustrated in FIG. 1. Host device 102 may interact with database 114, host device 104 may interact with database 112 and database 118, host device 106 may interact with database 116, and host device 108 may interact with database 112, database 114, and database 118.

It should be apparent to a person skilled in the art, however, that the protocols associated with the host devices or databases are not limited to the protocols discussed in this example and other protocols such as, e.g., Serial Attached Small Computer System Interface (SCSI) protocol and Serial Attached SCSI (SAS) protocol may also be associated with the host devices.

Figure 2A:
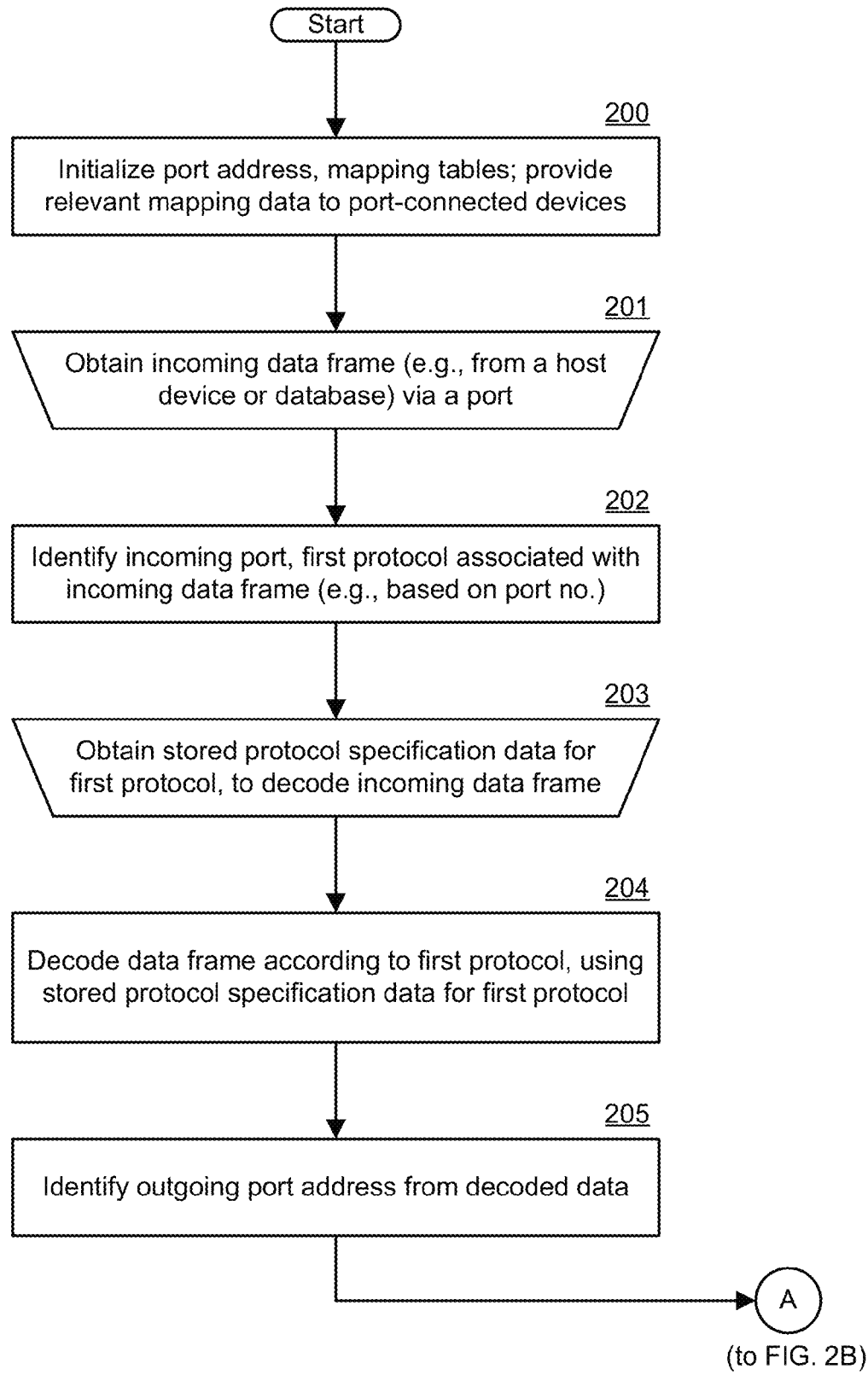
FIGS. 2A-B illustrate a flowchart of an example method of multi-protocol translation in accordance with some embodiments.
Figure 2B:
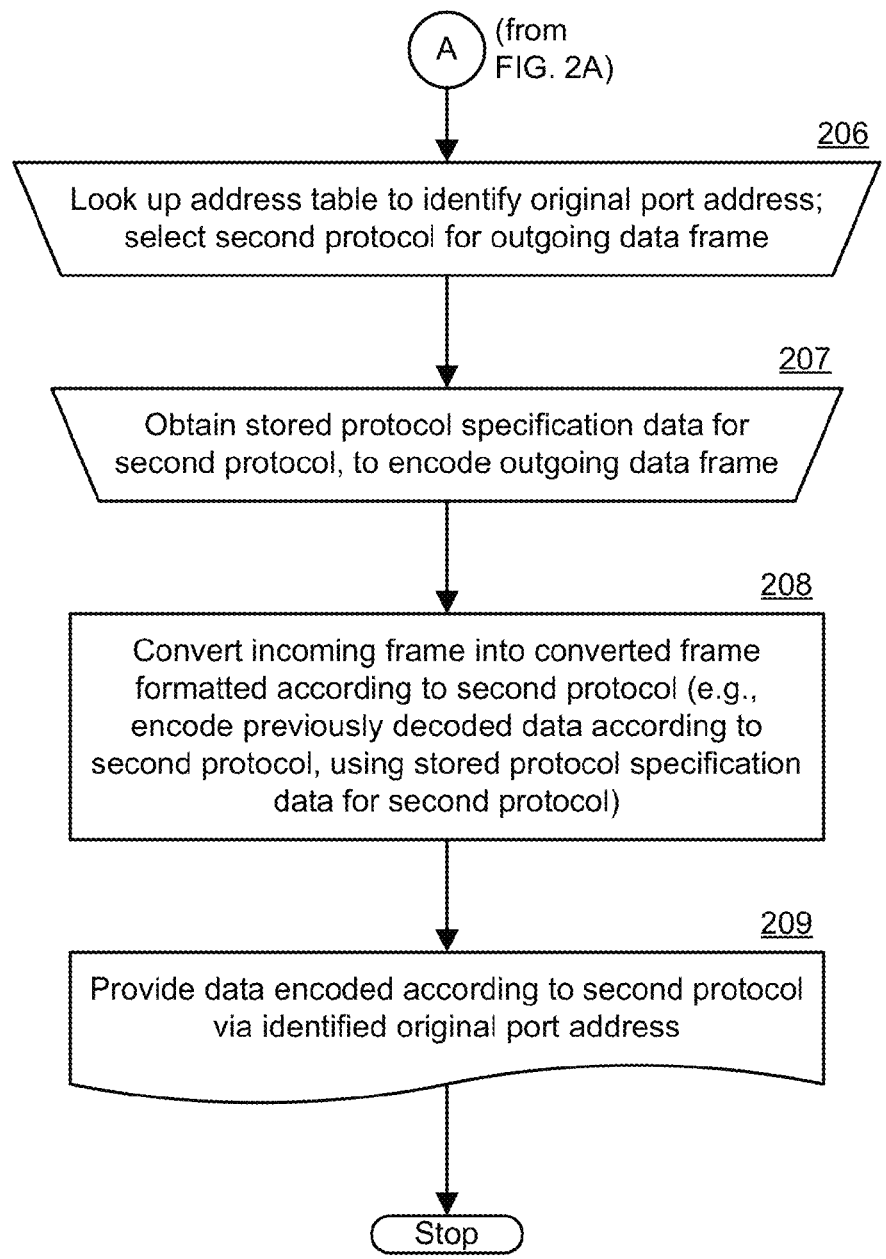

FIGS. 2A-B illustrate a flowchart of an example method of multi-protocol translation that may be performed by a switching device in a SAN environment in accordance with some embodiments. With reference to FIG. 2B, in some embodiments, the switching device may be initialized (step 200). For example, the switching may be initialized on being powered up or being reset.

For purposes of this disclosure, initialization of the switching device may include storing original addresses of devices such as host devices and databases connected to all ports of the switching device. In some embodiments, the original address of a device may represent the physical address of the device that is assigned to the device at the time of manufacture. Further, the switching device may associate an original address of a device connected to a port with the port number and store it.

Initialization may further include assigning one or more virtual addresses to each of the ports of the switching device through which host devices and databases may be connected to the switching device. In one embodiment, a port may be assigned multiple virtual addresses corresponding to various protocols supported by the switching device, except the protocol of the device connected to the port. For example, if a port 1 of the switching device is connected to an SAS host device, virtual addresses corresponding to all other protocols supported by the switching device except SAS protocol, may be assigned to this port. Here, port 1 may be assigned a FC virtual address, a IB virtual address, a iSCSI virtual address etc.

The virtual addresses corresponding to a protocol may be assigned by using an address format of that protocol. In keeping with the previous example, a virtual address corresponding to an SAS protocol may be assigned based on the address format supported by SAS protocol. In some embodiments, the address format of each protocol may be stored as a part of a protocol format specification data for that protocol which is described in detail later in this disclosure.

It should be apparent to a person skilled in the art that the discussed protocols are considered for exemplary purposes only and other protocols that are associated with SAN environment may also be supported by the switching device and corresponding virtual addresses may be assigned to a port of the switching device.

In an exemplary scenario, SAS port 1 of the switching device may be connected to a source device such as an SAS host device and FC port 6 of the switching device may be connected to a destination device an FC device. Here, SAS port 1 may be assigned an FC virtual address, an IB virtual address, and an iSCSI virtual address. The FC virtual address assigned to SAS port 1 may later enable an FC device connected to an FC port 6 to identify the SAS host device as the source device because the FC virtual address represents the address of the SAS host device in an FC address format. Similarly, an IB virtual address assigned to SAS port 1 may enable an IB device connected to an IB port 8 to identify the SAS host device as the source device because the IB virtual address represents the address of the SAS host device in an IB address format.

Once the virtual addresses are assigned to all the ports connected to the switching device, the switching device may create an address table 1 as illustrated below. In some embodiments, the address table 1 may be created by including the original address and the virtual addresses assigned to each port by mapping these addresses to the corresponding port number. The address table 1 may then be stored in a memory of the switching device.

TABLE I

Example Switching Device Port Original and Virtual Addresses

| Port | Original address | Virtual addresses | | | |
|---|---|---|---|---|---|
| SAS port 1 | SAS original address 1 | FC virtual address 1 | | iSCSI virtual address 1 | IB virtual address 1 |
| FC port 2 | FC original address 2 | SAS virtual address 2 | | iSCSI virtual address 2 | IB virtual address 2 |
| iSCSI port 3 | iSCSI original address 3 | SAS virtual address 3 | | FC virtual address 3 | IB virtual address 3 |

TABLE I-continued

Example Switching Device Port Original and Virtual Addresses

| Port | Original address | Virtual addresses | | |
|---|---|---|---|---|
| IB port 4 | IB original address 4 | SAS virtual address 4 | FC virtual address 4 | iSCSI virtual address 4 |

As illustrated in the example address table 1, for SAS port 1, the switching device may store the original address of the SAS host device connected to port 1, e.g., SAS original address 1. Further, SAS port 1 may be assigned 3 virtual addresses—e.g., FC virtual address 1, iSCSI virtual address 1, and an IB virtual address—corresponding to each of the 3 other protocols supported by the switching device—FC, iSCSI, and IB protocols, respectively. All these addresses may be stored in the address table 1 with SAS port 1.

It should be apparent to a person skilled in the art that address table 1 represents original and virtual addresses of ports 1-4 only for exemplary purposes. The original and virtual addresses of all such input and output ports of the switching device may be included in a similar manner in the address table 1.

Once the address table 1 is created, the switching device may create a mapping between each input port and the addresses assigned to all output ports. The mapping may later be used by a source device connected to an input port to communicate with a destination device connected to an output port of the switching device. In some embodiments, the mapping may be represented by a mapping table 2 as illustrated below:

As illustrated in the mapping table 2, in case a destination device connected to an output port is associated with the same protocol as a source device connected to an input port, the mapping table may represent the original address of the output port against the input port. For example, for a mapping between SAS input port 1 and SAS output port 5, the mapping table 2 may represent the original address of the SAS output port 5—"SAS original address 5" against SAS input port 1 because both SAS port 1 and SAS port 5 are associated with SAS protocol. However, in case a destination device connected to the output port is associated with a different protocol than a source device connected to the input port, the mapping table 2 may represent a virtual address assigned to the output port that corresponds to a protocol associated with the input port. For example, as illustrated in the mapping table 2, for a mapping between SAS port 1 and FC port 6, the mapping table may represent a virtual address of FC port 6 in SAS protocol format, i.e., "SAS virtual address 6." Here, "SAS virtual address 6" represents the address of the destination device connected to the SAS port 6 in SAS protocol format.

TABLE 2

Example Input-Output Port Address Mapping

| Port | SAS port 5 (output) | FC port 6 (output) | iSCSI port 7 (output) | IB port 8 (output) |
|---|---|---|---|---|
| SAS port 1 (input) | SAS original address 5 | SAS virtual address 6 | SAS virtual address 7 | SAS virtual address 8 |
| FC port 2 (input) | FC virtual address 5 | FC original address 6 | FC virtual address 7 | FC virtual address 8 |
| iSCSI port 3 (input) | iSCSI virtual address 5 | iSCSI virtual address 6 | iSCSI original address 7 | iSCSI virtual address 8 |
| IB port 4 (input) | IB virtual address 5 | IB virtual address 6 | IB virtual address 7 | IB original address 8 |

Once the mapping table 2 is created, the switching device, during initialization, may further provide entries of the mapping table corresponding to a port, to the source device connected through that port (see step). As an illustration, in keeping with the previous example, once the mapping table 2 is created, the switching device may provide the entries corresponding to SAS port 1 to the SAS host device connected to the switching device through the SAS port 1. In this example, the switching device may provide the addresses of output ports mapped to SAS port 1 to the SAS host device connected to the switching device through SAS port 1. The switching device may thus, provide SAS original address 5, SAS virtual address 6, SAS virtual address 7, SAS virtual address 8 to the SAS host device connected to the switching device through SAS input port 1. On receiving the addresses, SAS host device may display these addresses to enable a user to see the addresses of all destination devices in SAS protocol format. Thus, the user of the SAS host device may select a destination device such as a database connected to an output port (ports 5-8) by selecting an address from the displayed addresses for transmitting data to the selected destination device.

Once the switching device is initialized, it may receive a frame formatted according to a first protocol in step 201. In some embodiments, the switching device may receive multiple frames that are formatted according to a single protocol. These frames may be received as a part of one or more data streams from a source device such as a host device connected to the switching device. A host device may provide one or more data streams formatted according to the protocol associated with the host device to the switching device. In keeping with the previous example, the SAS host device connected to SAS port 1 may provide one or more data streams including frames formatted according to SAS protocol. Similarly, an IB host device connected to IB port 4 may provide one or more data streams including frames formatted according to IB protocol, and so on. In some embodiments, the switching device may receive data streams from multiple host devices that are associated with different protocols. In this scenario, the received data streams may be formatted according to various different protocols. On receiving each data stream, the switching device may store one or more frames received in the data stream in an input buffer for processing at a later stage.

Further, a processor of the switching device may determine routing information based on address information included in the received frame (e.g., step 205). The address information may include source address information that represents an address of the source such as a host device, in some embodiments. The address information may also include destination address information that represents an address of a destination device such as database, in some embodiments. In keeping with the previous example a source device such as the SAS host device connected to SAS port 1 may transmit a frame formatted according to SAS protocol to a destination device such as FC database connected to FC port 6 via the switching device. A user of the SAS host device may use the mapping table 2 to see the address of the FC database. The address of the FC database may be represented as a virtual address—"SAS virtual address 6" to the user of the SAS host device. The "SAS virtual address 6" may then be included as the destination address information and the original address of the SAS host device "SAS original address 1" may be included as source information in the frame to be transmitted.

On receiving the frame, in some embodiments, the processor may need to decode the frame to extract address information from the received frame (step 204). In such embodiments, the processor may identify a first protocol associated with the incoming frame (step 202). In some embodiments, the processor may identify the first protocol based on the incoming port on which the frame was received. For example, the processor may identify that a frame received from SAS host device connected to SAS port 1 should be decoded according to format specification data corresponding to the SAS protocol. In some embodiments, the switching device may employ an operating mechanism similar to the stored program concept. Accordingly, the processor may retrieve format specification data corresponding to the first protocol of the received frame from a database (step 203). In the manner that program instructions convert a general purpose processor into processor configured for a specific purpose, the format specification data may be utilized by the processor to configured the multi-protocol translation-capable switching device into one configured to translate the protocol corresponding to the received frame into either decoded data or a converted frame formatted according to a different protocol. Format specific data for decoding data formatted according to a protocol, or for converting a frame from one protocol to another, may be stored in a database (e.g., as XML/JSON/other structured data, free-form text, SQL record, etc.). The processor may decode the received frame according to the format specification data obtained from the database (step 204).

With reference to FIG. 2B, in some embodiments, the processor of the switching device may determine routing information based on the source address information and the destination address information in the received frame. This may include determining an original address of the destination device, e.g., FC database, from the virtual address of the FC database (step 206). In some embodiments, the processor may look up the address table 1 by querying it using a keyword "SAS virtual address 6" to search for a corresponding original address of the FC database (not shown in address table 1). On determining the original address of the FC database, the processor may determine a protocol associated with the FC database i.e., FC protocol (step 206).

In addition, in some embodiments, the processor may also determine a virtual address of the source device i.e., SAS host device in FC protocol format by using the address table 1. In some embodiments, the processor may query the address table 1 using a keyword "SAS original address 1" to find a corresponding virtual address in FC protocol format— "FC virtual address 1." This virtual address may later enable the FC database to identify the SAS host device as the source device because the address of the SAS host device is represented in the FC protocol format.

In step 206, the processor may select a second protocol from a plurality of protocols according to which the received frame is to be converted. In some embodiments, the second protocol may be selected from a list of protocols maintained by the processor in the switching device. The list may include all SAN protocols that are supported by the switching device. The list may be created at the time of manufacturing the switching device and stored in the switching device for future use. Further, the list may be updated at a later stage by an administrator, for example, if a new SAN protocol needs to be added to the switching device.

In some embodiments, the second protocol may be selected from the list based on the determined protocol format associated with the destination device to which the frame is to be sent. In keeping with the previous example, once the processor determines from the routing information that the destination device such as the FC database is associated with FC protocol the processor may select FC protocol from the list of protocols. Similarly, one of the other protocols such as IB, iSCSI, and Ethernet protocols etc. may be selected for converting the received frame based on which protocol the destination device is associated with.

On selecting the second protocol, the processor may obtain a protocol format specification data of the second protocol in step 207. The processor may maintain protocol format specification data of all the protocols represented in the list in a memory of the switching device. In some embodiments, the protocol format specification data for each protocol may be maintained in a protocol store in the switching device. The protocol format specification data associated with a protocol may specify various parameters associated with a protocol such as frame format, address format, frame size, size of payload in a frame, bandwidth associated with the protocol, maximum speed of transmission associated with the protocol. In some embodiments, the frame format of a protocol may specify format of one or more of but not limited to, a preamble, start of frame delimiter, an end of frame delimiter, frame type, a frame check sequence, and a frame header that may include source address and destination address information, bitrate, sampling rate etc.

In one example, format specification data for FC protocol may specify that that FC protocol supports 8 GBps as a maximum transmission speed, a frame size of 2148 bytes with 2112 bytes of payload size, and a 64-bit name addressing format—World Wide Name (WWN) format. Similarly, iSCSI protocol supports a maximum transmission speed of 10 GBps, a 0-255 character long iSCSI Qualifier name (IQN) format addressing mechanism, a frame size of 1500 bytes, and a payload size of 1460 bytes. Additionally, SAS Protocol supports 6 GBps of maximum transmission speed, a frame size of 1024 bytes, and a 64-bit name addressing format—World Wide Name (WWN) format]. The format specification format for all the protocols may be stored in the protocol store in a similar manner as discussed in this example.

In some embodiments, when the list of protocols is updated to add a new protocol, the format specification data for the newly added protocol may also be added to the protocol store by an administrator, for example, for future use.

In step 208, the processor may convert the received frame to a converted frame according to the second protocol based on the protocol format specification data of the second protocol. In some embodiments, to convert the received frame to the converted frame, the processor may separate a non-payload portion from a payload portion of the received frame. The payload portion may include data associated with the source device, which may be for example, be a host device. The non-payload portion of the frame may include, but not limited to, one or more of a preamble, frame header that includes source and destination address information, start of frame delimiter, an end of frame delimiter, frame type, frame size i.e., length of the frame, and a frame check sequence.

In some embodiments, the conversion of a frame from the first protocol to the second protocol may include converting the non-payload portion of the frame formatted according to the first protocol to a non-payload portion formatted according to the second protocol. The non-payload portion may be converted by using the protocol format specification data of the second protocol. The conversion of the non-payload portion may include converting the frame format and address format of the frame from the first protocol to the second protocol. In addition, the conversion may also include modifying the size of the frame from the first protocol to the second protocol.

In an exemplary scenario, a frame conversion from FC protocol to iSCSI protocol may include converting the non-payload portion of a frame formatted according to the FC protocol to a non-payload portion that is formatted according to iSCSI protocol. The conversion of the non-payload portion may include converting the frame format of the received frame according to FC protocol to a frame format according to iSCSI protocol. This may include converting the format of various blocks of the frame from FC to iSCSI format by using the protocol format specification data of iSCSI protocol. Here, blocks of the frame such as preamble, SOF and/or DOF delimiters, and frame type etc. may be converted from FC format to iSCSI format. While converting, new blocks may be added or existing blocks may be removed as required by the iSCSI protocol format.

Further, the conversion may also include converting the address information of the frame from FC to iSCSI format. This may include converting the source and destination address information included in the frame from FC to iSCSI format. In some embodiments, converting the address format may include adding the original destination address determined as routing information in step 205, to the non-payload portion formatted according to the second protocol. Converting the address information may further include adding the virtual source address to the non-payload portion formatted according to the second protocol. Thus, the original destination address and the virtual source address may be included as address information in the non-payload portion formatted according to the second protocol.

In addition, the conversion may include modifying the size of the frame as required by the iSCSI protocol based on the protocol format specification data of iSCSI protocol. The modification of size of the frame may also include modifying the size of the non-payload portion as required by the iSCSI protocol. Here, the size of the frame may be converted from 2148 bytes as supported by FC protocol to 1500 bytes as supported by iSCSI protocol.

Once the non-payload portion is converted from the first protocol to the second protocol, a new converted frame may be constructed by including the converted non-payload portion and the payload portion that was separated from the non-payload portion of the received frame. While adding the payload portion to the converted frame, the size of the payload portion may be modified as required by the second protocol. In case the size of payload portion supported by the second protocol is less than the size of the separated payload portion, the payload portion may be split up and included in another converted frame. However, if the size of payload portion supported by the second protocol is more than the size of the separated payload portion, size of the separated payload portion may be increased by padding the payload portion.

In step 209, the converted frame may be provided to an output buffer for storing the converted frame. The converted frame may be buffered to determine whether the transmission speed of the converted frame needs to be adjusted before transmitting it to the destination device, which may be a database in some embodiments. In some embodiments, the processor may determine that a speed mismatch exists between the first protocol and the second protocol. This may occur if the maximum speed supported by the second protocol is lower than the speed at which the frame is received by the switching device over the first protocol. The processor may thus adjust the speed of transmission of the converted frame according to the maximum speed supported by the second protocol by using the protocol format specification data of the second protocol.

In one example, a frame may be received by the switching device from an FC host device at a speed of 8 GBps and may further be converted according to SAS protocol that supports a maximum speed of 6 GBps. Thus, while the converted SAS frame is buffered, the speed mismatch between FC and SAS protocols may be determined and the transmission speed of the converted SAS frame may be adjusted to comply with the requirement of SAS protocol—6 GBps.

Once the transmission speed of the converted frame is adjusted according to the second protocol, the frame is transmitted to the destination device at the adjusted transmission speed. However, if a mismatch between the first protocol and the second protocol does not occur, the converted frame may be transmitted at the speed at which the frame formatted according to the first protocol was received.

Figure 3:
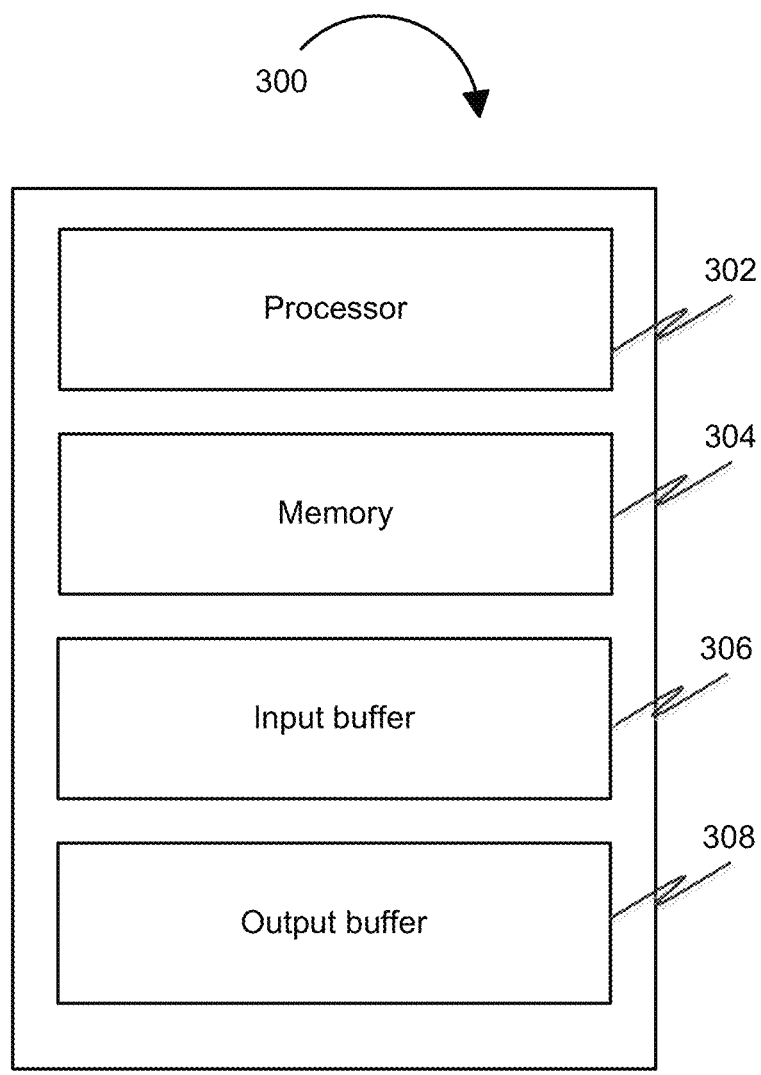
FIG. 3 illustrates a block diagram of an example frame translation apparatus for multi-protocol translation in accordance with some embodiments.

FIG. 3 illustrates a block diagram of a frame translation apparatus 300 for implementing multi-protocol translation in accordance with some embodiments. In some embodiments, frame translation apparatus 300 may include a processor 302, a memory 304, an input buffer 306, and an output buffer 308.

In some embodiments, frame translation apparatus 300 may include a switching device that translates frames transmitted by a source device (not shown) and sends it to a destination device (not shown). Once frame translation apparatus 300 is initialized, processor 300 may assign virtual addresses corresponding to each protocol supported by frame translation apparatus 300 to each of the ports of frame translation apparatus 300. Further, the virtual addresses assigned to each port and an original address of a device connected to each port may be represented by an address table 1 as discussed in the context of FIG. 2A-B. The address table 1 may be stored in memory 304.

Processor 304 may further create a mapping table 2 as discussed in detail in the context of FIGS. 2A-B. The mapping table 2 may represent a mapping between each input port and the addresses assigned to all output ports. In some embodiments, all the addresses (original and virtual addresses associated with the port) corresponding to a port in the mapping table 2 may be provided to the source device connected to that port. This may enable a user of the source device to see the addresses of all destination devices connected to frame translation apparatus 300 in the same protocol format as the source device.

Processor 302 may receive one or more frames from the source device and store the received frames in an input buffer 306 before translating the frames at a later stage. A received frame may be formatted according to a first protocol associated with the source device. Processor 302 may determine routing information by using the received frame. This may include determining an original address of the destination device from the virtual address of the destination device by using the mapping table 2, the details of which have been discussed in the context of FIGS. 2A-B. In addition, processor 302 may determine a virtual address of the source device from the original address of the source device included in the received frame by using the mapping table 2.

Further, processor 302 may determine a second protocol associated with the destination device based on the original address of the destination device that is determined as routing information. Processor 302 may further select the second protocol from a plurality of protocols in response to determining the second protocol. Once the second protocol is selected, processor 302 may obtain a protocol format specification data associated with the second protocol. The protocol format specification data associated with each of the protocols may be maintained by processor 302 in memory 304. In some embodiments, the protocol format specification data associated with a protocol may specify various parameters associated with a protocol such as frame format, address format, frame size, size of payload in a frame, bandwidth associated with the protocol, maximum speed of transmission associated with the protocol. Here, the frame format of a protocol may specify format of one or more of but not limited to, a preamble, start of frame delimiter, an end of frame delimiter, frame type, and a frame check sequence.

Once, the protocol format specification data for the second protocol is obtained, processor 302 may convert the received frame to a converted frame according to the second protocol based on the protocol format specification data of the second protocol. In some embodiments, to convert the received frame to the converted frame, processor 302 may separate a non-payload portion from a payload portion of the received frame. Processor 302 may then convert the non-payload portion of the received frame formatted according to the first protocol to a non-payload portion that is formatted according to the second protocol.

In some embodiments, the non-payload portion of the received frame may be converted by using the protocol format specification data of the second protocol. The conversion of the non-payload portion may include converting the frame format and address information of the frame from the first protocol to the second protocol. The conversion of the non-payload portion may further include modifying the size modifying the size of the frame from the first protocol to the second protocol.

On converting the non-payload portion from the first protocol to the second protocol, a new converted frame may be constructed by including the converted non-payload portion and the payload portion that was separated from the non-payload portion of the received frame. While adding the payload portion to the converted frame, the size of the payload portion may be modified as required by the second protocol by padding or splitting the payload portion as required by the second protocol.

On constructing the converted frame, the converted frame may be provided to output buffer 308 for storing the converted frame. The converted frame may be buffered to determine whether the transmission speed of the converted frame needs to be adjusted before transmitting it to the destination device. In some embodiments, processor 302 may determine that a speed mismatch exists between the first protocol and the second protocol. On determining that a speech mismatch exists, processor 302 may then adjust the speed of transmission of the converted frame according to the maximum speed supported by the second protocol by using the protocol format specification data of the second protocol. Once the transmission speed of the converted frame is adjusted according to the second protocol, the frame is transmitted to the destination device at the adjusted transmission speed. However, if a mismatch between the first protocol and the second protocol does not occur, the converted frame may be transmitted at the speed at which the frame formatted according to the first protocol was received.

This disclosure provides a number of advantages including, without limitation, methods, non-transitory computer readable media, apparatuses, and systems that enable multi-protocol translation of frames by storing protocol format specification data of various protocols. A protocol according to which a frame is to be translated may be selected from a stored list of protocols to implement the translation. Thus, using a frame translation apparatus that maintains a centralized database of multiple protocol formats and a centralized processor for translating between protocols prevents the need to install multiple dedicated line cards for various protocols in the switching device. This further reduces circuit complexity and total cost of ownership. Moreover, new protocols may be added to the frame translation apparatus without installing new line cards and adding multiple processors, which further saves the total cost of ownership.

Computer System

FIG. 4 is a block diagram of an exemplary computer system for implementing embodiments consistent with the present disclosure. Variations of computer system 401 may be used for implementing any of the devices presented in this disclosure. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/ source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for multi-protocol translation. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transmitting a frame of a data stream from a first network device associated with a first network protocol to a second network device associated with a second network protocol, the method being performed by a storage area network switch including a first port coupled with the first network device and a second port coupled with the second network device, the method comprising:
    associating the first port with the first network protocol;
    assigning a first virtual address to the first port, the first virtual address being represented in an address format associated with the second network protocol;
    assigning a second virtual address to the second port, the second virtual address being represented in an address format associated with the first network protocol;
    establishing a first mapping table that maps the first port to a first original address of the first network device and the first virtual address, and that maps the second port to a second original address of the second network device and the second virtual address;
    establishing, based on the first mapping table, a second mapping table that maps the first port and the second port to the second virtual address;
    providing, based on the second mapping table, the second virtual address to the first network device;
    receiving, from the first network device via the first port, a first frame, the first frame including the second virtual address as a destination address and the first original address as a source address;
    obtaining the second virtual address and the first original address from the first frame;
    determining, based on the second virtual address obtained from the first frame, and the first mapping table, that a destination device for the first frame is connected to the second port;
    determining, based on the first original address obtained from the first frame, and the first mapping table, the first virtual address;
    generating a second frame of the second network protocol to include the data included in the first frame, the second frame including the first virtual address as the source address; and
    transmitting the second frame to the second network device via the second port;
    wherein the first and second network protocols comprise at least one of: Ethernet; InfiniBand; Serial Attached Small Computer System Interface; Internet Small Computer System Interface; and Fibre Channel protocols.

2. The method of claim 1, further comprising separating a payload portion from a non-payload portion of the first frame.

3. The method of claim 2, further comprising:
    determining, based on the second virtual address obtained from the first frame, and the first mapping table, the second original address;
    determining, based on the second original address determined from the first mapping table, and the first mapping table, that the destination device is associated with the second network protocol;
    after determining that the destination device is associated with the second network protocol, acquiring second network protocol format specification data that define one or more parameters including at least one of: frame format, address format, frame size, size of payload in a frame, bandwidth associated with the protocol, maximum speed of transmission associated with the second network protocol;
    extracting the non-payload portion of the first frame; and
    constructing the second frame including the non-payload portion based on at least one of the address format, the frame format, and frame size defined in the second network protocol format specification data.

4. The method of claim 3,
    wherein the second frame is constructed based on the frame size specified in the second network protocol format specification data.

5. The method of claim 3, further comprising: determining whether a speed mismatch exists between the first network protocol and the second network protocol based on the maximum speed of transmission defined in the second network protocol format specification data.

6. The method of claim 5, further comprising: adjusting a transmission speed of the second frame according to the maximum speed of transmission defined in the second network protocol format specification data after determining that the speed mismatch exists between the first network protocol and the second network protocol; wherein the second frame is transmitted according to the transmission speed.

7. The method of claim 6, wherein adjusting the transmission speed of the second frame comprises buffering the second frame.

8. An apparatus for transmitting a frame of a data stream from a first network device associated with a first network protocol to a second network device associated with a second network protocol, comprising:
    a first port coupled with the first network device;
    a second port coupled with the second network device;
    a processor; and
    a memory storing instructions that, when executed by the processor, wherein the instructions comprise instructions to:

assign a first virtual address to the first port, the first virtual address being represented in an address format associated with the second network protocol;

assign a second virtual address to the second port, the second virtual address being represented in an address format associated with the first network protocol;

establish a first mapping table that maps the first port to a first original address of the first network device and the first virtual address, and that maps the second port to a second original address of the second network device and the second virtual address;

establish, based on the first mapping table, a second mapping table that maps the first port and the second port to the second virtual address;

provide, based on the second mapping table, the second virtual address to the first network device;

receive, from the first network device via the first port, a first frame, the first frame including the second virtual address as a destination address and the first original address as a source address;

obtain the second virtual address and the first original address from the first frame;

determine, based on the second virtual address obtained from the first frame, and the first mapping table, that a destination device for the first frame is connected to the second port;

determine, based on the first original address obtained from the first frame, and the first mapping table, the first virtual address;

generate a second frame of the second network protocol to include the data included in the first frame, the second frame including the first virtual address as the source address; and transmit the second frame to the second network device via the second port;

wherein the first and second network protocols comprise at least one of: Ethernet; InfiniBand; Serial Attached Small Computer System Interface; Internet Small Computer System Interface; and Fibre Channel protocols.

9. The apparatus of claim 8, wherein the instructions further comprise instructions to: separate a payload portion from a non-payload portion of the first frame.

10. The apparatus of claim 9, wherein the instructions further comprise instructions to:

determine, based on the second virtual address obtained from the first frame, and the first mapping table, the second original address;

determine, based on the second original address determined from the first mapping table, and the first mapping table, that the destination device is associated with the second network protocol;

after determining that the destination device is associated with the second network protocol, acquire second network protocol format specification data that define one or more parameters including at least one of: frame format, address format, frame size, size of payload in a frame, bandwidth associated with the protocol, maximum speed of transmission associated with the second network protocol;

extract the non-payload portion of the first frame; and construct the second frame including the non-payload portion based on at least one of the address format, the frame format, and frame size defined in the second network protocol format specification data.

11. The apparatus of claim 10, wherein the second frame is constructed based on the frame size specified in the second network protocol format specification data.

12. The apparatus of claim 10, wherein the instructions further comprise instructions to: determine whether a speed mismatch exists between the first network protocol and the second network protocol based on the maximum speed of transmission defined in the second network protocol format specification data.

13. The apparatus of claim 12, the instructions further comprising instructions to: adjust a transmission speed of the second frame according to the maximum speed of transmission defined in the second network protocol format specification data after determining that the speed mismatch exists between the first network protocol and the second network protocol; wherein the second frame is transmitted according to the transmission speed.

14. The apparatus of claim 13, wherein adjusting the transmission speed of the second frame comprises buffering the second frame.

15. A non-transitory computer readable medium having stored thereon computer-executable instructions that, when executed by a storage area network switch including a first port coupled with the first network device and a second port coupled with the second network device, causes the storage area network switch to perform a method of transmitting a frame of a data stream from the first network device to the second network device, the method comprising:

assigning a first virtual address to the first port, the first virtual address being represented in an address format associated with the second network protocol;

assigning a second virtual address to the second port, the second virtual address being represented in an address format associated with the first network protocol;

establishing a first mapping table that maps the first port to a first original address of the first network device and the first virtual address, and that maps the second port to a second original address of the second network device and the second virtual address;

establishing, based on the first mapping table, a second mapping table that maps the first port and the second port to the second virtual address;

providing, based on the second mapping table, the second virtual address to the first network device;

receiving, from the first network device via the first port, a first frame, the first frame including the second virtual address as a destination address and the first original address as a source address;

obtaining the second virtual address and the first original address from the first frame;

determining, based on the second virtual address obtained from the first frame, and the first mapping table, that a destination device for the first frame is connected to the second port;

determining, based on the first original address obtained from the first frame, and the first mapping table, the first virtual address;

generating a second frame of the second network protocol to include the data included in the first frame, the second frame including the first virtual address as the source address; and transmitting the second frame to the second network device via the second port;

wherein the first and second network protocols comprise at least one of: Ethernet; InfiniBand; Serial Attached Small Computer System Interface; Internet Small Computer System Interface; and Fibre Channel protocols.

16. The medium of claim 15, the instructions further comprising instructions for: separating a payload portion from a non-payload portion of the first frame.

17. The medium of claim 16, wherein the instructions further comprising instructions for:
determining, based on the second virtual address obtained from the first frame, and the first mapping table, the second original address;
determining, based on the second original address determined from the first mapping table, and the first mapping table, that the destination device is associated with the second network protocol;
after determining that the destination device is associated with the second network protocol, acquiring second network protocol format specification data that define one or more parameters including at least one of: frame format, address format, frame size, size of payload in a frame, bandwidth associated with the protocol, maximum speed of transmission associated with the second network protocol;
extracting the non-payload portion of the first frame; and
constructing the second frame including the non-payload portion based on at least one of the address format, the frame format, and frame size defined in the second network protocol format specification data.

18. The medium of claim 17,
wherein the second frame is constructed based on the frame size specified in the second network protocol format specification data.

19. The medium of claim 17, the instructions further comprising instructions for: determining whether a speed mismatch exists between the first network protocol and the second network protocol based on the maximum speed of transmission defined in the second network protocol format specification data.

20. The medium of claim 19, the instructions further comprising instructions for: adjusting a transmission speed of the second frame according to the maximum speed of transmission defined in the second network protocol format specification data after determining that the speed mismatch exists between the first network protocol and the second network protocol; wherein the second frame is transmitted according to the transmission speed.

21. The medium of claim 20, wherein adjusting the transmission speed of the second frame comprises buffering the second frame.

22. The method of claim 3, further comprising:
acquiring first network protocol format specification data based on an association between the first port and the first network protocol;
decoding the first frame based on the first network protocol format specification data; and
determining, based on the decoded first frame, the second virtual address as the destination address and the first original address as the source address.

23. The apparatus of claim 10, wherein the instructions comprise instructions to:
acquire first network protocol format specification data based on an association between the first port and the first network protocol;
decode the first frame based on the first network protocol format specification data; and
determine, based on the decoded first frame, the second virtual address as the destination address and the first original address as the source address.

24. The medium of claim 17, the instructions further comprising instructions for:
acquiring first network protocol format specification data based on an association between the first port and the first network protocol;
decoding the first frame based on the first network protocol format specification data; and
determining, based on the decoded first frame, the second virtual address as the destination address and the first original address as the source address.

* * * * *